(12) United States Patent
Korondi et al.

(10) Patent No.: US 9,674,158 B2
(45) Date of Patent: Jun. 6, 2017

(54) USER AUTHENTICATION OVER NETWORKS

(71) Applicant: International Business Machines Corporation, Armonk, NY (US)

(72) Inventors: Mark Korondi, Thalwil (CH); Daniel Kovacs, Adliswil (CH); Zoltan Arnold Nagy, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/811,269

(22) Filed: Jul. 28, 2015

(65) Prior Publication Data

US 2017/0034133 A1    Feb. 2, 2017

(51) Int. Cl.
*H04L 29/06* (2006.01)
*H04L 9/32* (2006.01)

(52) U.S. Cl.
CPC ........ *H04L 63/0428* (2013.01); *H04L 9/3247* (2013.01); *H04L 63/061* (2013.01); *H04L 63/08* (2013.01); *H04L 63/0815* (2013.01)

(58) Field of Classification Search
CPC .......................... H04L 63/0815; H04L 9/3247
See application file for complete search history.

(56) References Cited

U.S. PATENT DOCUMENTS 7,690,026 B2 *  3/2010  Zhu .......................... G06F 21/33
                                                          726/8
7,892,087 B1 *  2/2011  Hamman ................ G06F 21/64
                                                          463/22

(Continued)

OTHER PUBLICATIONS

Building the IBM 4758 Secure Coprocessor; Joan G. Dyer et al.; 2001; IEEE.*

*Primary Examiner* — James Turchen
(74) *Attorney, Agent, or Firm* — Scully, Scott, Murphy & Presser, P.C.; Daniel P. Morris, Esq.

(57) ABSTRACT

Methods are provided for authenticating user authentication data, associated with a user ID, at an authentication system. The authentication system comprises an authentication server connected to a network, and a secure cryptoprocessor operatively coupled to the authentication server. A first token for the user ID is provided in data storage operatively coupled to the authentication server. The first token is produced by the secure cryptoprocessor by encoding the user authentication data associated with the user ID via an encoding process dependent on a secret key of the secure cryptoprocessor. The authentication server receives an authentication request for the user ID from a remote computer via the network. The authentication request comprises a ciphertext encrypting user authentication data under a public key of a first public-private key pair, the private key of which is secret to the secure cryptoprocessor. The authentication server supplies the ciphertext to the secure cryptoprocessor which decrypts the ciphertext using this private key to obtain plaintext user authentication data. The authentication server retrieves the first token for the user ID from the data storage. The authentication system checks for equality of the plaintext user authentication data and the user authentication data encoded in the first token via a cryptographic processing operation in which the authentication data is not exposed outside the secure cryptoprocessor. In response to such equality, the authentication server sends an authentication confirmation message to the remote computer via the network.

16 Claims, 8 Drawing Sheets

(56) References Cited

U.S. PATENT DOCUMENTS

| | | | |
|---|---|---|---|
| 8,151,333 B2* | 4/2012 | Zhu | H04L 63/0815 380/44 |
| 8,190,920 B2* | 5/2012 | Matthews, Jr. | G06F 21/31 713/193 |
| 8,745,394 B1* | 6/2014 | Rahat | H04L 9/0825 380/285 |
| 8,832,812 B1* | 9/2014 | Morneau | 726/7 |
| 2004/0179684 A1* | 9/2004 | Appenzeller | H04L 9/0825 380/44 |
| 2006/0059363 A1* | 3/2006 | Mese | G06F 21/31 713/185 |
| 2006/0075224 A1* | 4/2006 | Tao | G06F 21/121 713/164 |
| 2006/0156026 A1* | 7/2006 | Utin | G06F 21/31 713/183 |
| 2007/0245414 A1* | 10/2007 | Chan | H04L 63/0823 726/12 |
| 2009/0292927 A1* | 11/2009 | Wenzel | G06F 21/41 713/185 |
| 2010/0100721 A1* | 4/2010 | Su | G06F 11/1456 713/150 |
| 2010/0131755 A1* | 5/2010 | Zhu | H04L 63/0815 713/155 |
| 2011/0289324 A1* | 11/2011 | Yellepeddy | G06F 21/79 713/189 |
| 2013/0073856 A1* | 3/2013 | Sherkin | H04L 9/006 713/176 |
| 2013/0097429 A1 | 4/2013 | Grandcolas et al. | |
| 2013/0166918 A1* | 6/2013 | Shahbazi | H04L 9/0863 713/183 |
| 2013/0191632 A1* | 7/2013 | Spector | H04L 9/083 713/155 |
| 2014/0333952 A1* | 11/2014 | Abe | G06F 3/1222 358/1.14 |
| 2015/0039883 A1* | 2/2015 | Yoon | H04L 9/0847 713/155 |
| 2015/0046710 A1* | 2/2015 | Clish | H04L 9/3273 713/169 |
| 2015/0048684 A1* | 2/2015 | Rooyakkers | H04L 9/3263 307/65 |
| 2015/0154136 A1* | 6/2015 | Markovic | G06F 13/4022 710/317 |
| 2015/0304110 A1* | 10/2015 | Oberheide | H04L 63/12 713/155 |
| 2016/0098555 A1* | 4/2016 | Mersh | G06F 21/51 713/187 |
| 2016/0147996 A1* | 5/2016 | Martinez | G06F 21/572 713/2 |

* cited by examiner

USER AUTHENTICATION OVER NETWORKS

BACKGROUND

The present invention relates generally to user authentication over networks, and more specifically to authentication of user authentication data transmitted over a network to an authentication system.

SUMMARY

According to at least one embodiment of the present invention there is provided a method for authenticating user authentication data, associated with a user ID, at an authentication system. The authentication system comprises an authentication server connected to a network, and a secure cryptoprocessor operatively coupled to the authentication server. The method includes providing a first token for the user ID in data storage operatively coupled to the authentication server. The first token is produced by the secure cryptoprocessor by encoding the user authentication data associated with the user ID via an encoding process dependent on a secret key of the secure cryptoprocessor. The authentication server receives an authentication request for the user ID from a remote computer via the network. The authentication request comprises a ciphertext encrypting user authentication data under a public key of a first public-private key pair, the private key of which is secret to the secure cryptoprocessor. The authentication server supplies the ciphertext to the secure cryptoprocessor which decrypts the ciphertext using this private key to obtain plaintext user authentication data. The authentication server retrieves the first token for the user ID from the data storage. The authentication system checks for equality of the plaintext user authentication data and the user authentication data encoded in the first token via a cryptographic processing operation in which the authentication data is not exposed outside the secure cryptoprocessor. In response to such equality, the authentication server sends an authentication confirmation message to the remote computer via the network.

Further embodiments of the present invention provide an authentication system for performing such an authentication method, and a computer-program product for causing an authentication system to perform such a method.

Embodiments of the invention will be described in more detail below, by way of illustrative and non-limiting example, with reference to the accompanying drawings.

DETAILED DESCRIPTION

Figure 1:
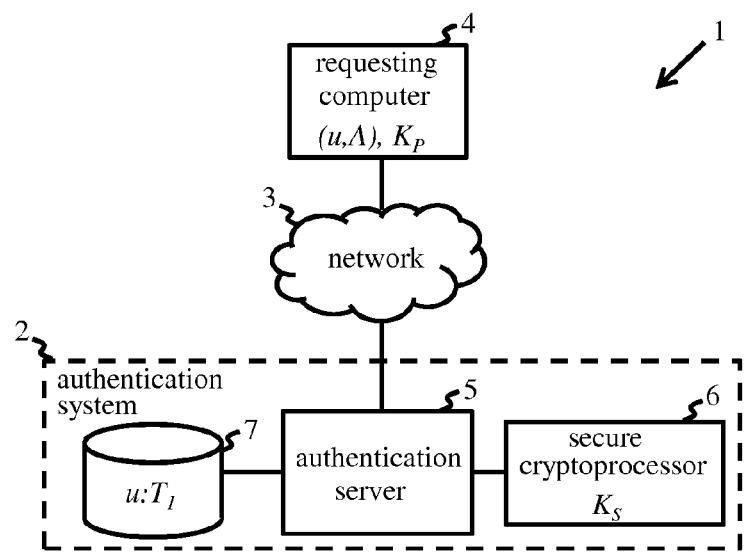
FIG. 1 is a schematic representation of a system in which authentication methods embodying the invention may be employed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a system in which authentication methods embodying the invention may be implemented. System 1 comprises an authentication system 2 connected via a network 3 to a remote requesting computer 4 which requests authentication of user authentication data A, associated with a particular user ID u, by authentication system 2 in operation. The network 3 may in general comprise one or more component networks and/or internetworks, including the Internet. Authentication system 2 comprises an authentication server 5 connected to the network 3, a secure cryptoprocessor 6 which is operatively coupled to the authentication server 5, and data storage, represented here by database 7, which is operatively coupled to the authentication server 5. The secure cryptoprocessor 6 stores a private key $K_S$ of a cryptographic public/private key pair ($K_S$, $K_P$) in accordance with a PKI (Public Key Infrastructure) system. PKI systems are well known in the art and the operational details are orthogonal to operation of the authentication methods described herein. The private key $K_S$ is generated by secure cryptoprocessor 6, in accordance with the PKI system, and remains secret to the secure cryptoprocessor. The public key $K_P$ is published in system 1 and is thus known to requesting computer 4. The secure cryptoprocessor 6 may additionally store one or more further cryptographic keys, also secret to the cryptoprocessor, for use in particular embodiments detailed below. Database 7 stores, for each user ID u for which user authentication may be required, a cryptographic token $T_1$. This token $T_1$ is produced by the secure cryptoprocessor by encoding (at least) the user authentication data A associated with the user ID u via an encoding process which is dependent on a secret key of the secure cryptoprocessor. Examples of this encoding process will be described below.

The authentication server 5 may be implemented by a general- or special-purpose computer, comprising one or more (real or virtual) machines, providing functionality for implementing operations described below. Server 5 may include a computer readable storage medium (which may comprise one or more component media) containing executable program instructions for causing the server to implement the functionality described.

The secure cryptoprocessor 6 provides a secure (tamper-resistant) environment for storage of cryptographic primitives and performance of cryptographic processing operations in the authentication processes to be described. Functionality of secure cryptoprocessor 6 may be implemented in general in hardware or software or a combination thereof. The secure cryptoprocessor may, for instance, comprise a tamper-proof computer, e.g. in the form of a hardware device such as a HSM (Hardware Security Module), TPM (Trusted Platform Module) or similar device providing the functionality to be described. Such a device may in general comprise one or more microprocessors on one or more processing chips. Security may be enforced by hardware and/or software measures which inhibit tampering and hence unauthorized access to cryptographic keys, etc., and modification of critical operations. The secure cryptoprocessor may include a computer readable storage medium (or media) containing executable program instructions for causing the cryptoprocessor to implement the functionality described. The secure cryptoprocessor may be integrated with authentication server 5 or may be provided in a separate device connected (directly or indirectly) with server 5, e.g. via a local network.

Data storage 7 may in general comprise any convenient data storage apparatus including one or more data storage media, and may be embodied in a single storage device or a plurality of storage devices of a distributed storage system for example. A typical implementation may comprise disk storage apparatus having one or more disks, such as magnetic or optical disks, which may be internal to authentication server 5, e.g. in a hard disk drive, and/or provided by externally-accessible disk apparatus, e.g. in a disk drive array such as a RAID array.

The requesting computer 4 may be provided, for example, by a Service Provider (SP) which offers controlled access to some service or other resource for authorized users. The requesting computer 4 may be implemented, for instance, by an access control server of the SP, which may comprise one or more (real or virtual) machines, to which users can connect via network 3 to present their authorization data and request access to the controlled resource. As another example, requesting computer 4 may be implemented by a user computer which can connect to authorization server 5 via network 3. Such a user computer may comprise a general- or special-purpose user device such as a desktop computer, laptop, tablet, notebook, palmtop, mobile phone, PDA (personal digital assistant), personal music player, or other user computer device. Such a user computer may include an application or other functionality to which access requires authorization of the user, and the user authorization data may be input by the user when requesting access.

The authentication system 2 may perform authentication operations for multiple users via one or more requesting computers 4. The system 2 may thus provide authentication-as-a-service (AaaS) for one or more providers of requesting computers or functionality thereof. The authentication system may, for example, be implemented as a service in a cloud computing environment. A brief description of cloud computing is given below. It is to be understood, however, that implementation of the teachings herein is not limited to a cloud computing environment, and embodiments of the invention can be implemented in conjunction with any other type of computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include the following characteristics.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms.

Resource pooling: the provider's computing resources are pooled to serve multiple consumers using a multi-tenant model, with different physical and virtual resources dynamically assigned and reassigned according to demand.

Rapid elasticity: capabilities can be rapidly and elastically provisioned, in some cases automatically, to quickly scale out, and rapidly released to quickly scale in. To the consumer, the capabilities available for provisioning often appear to be unlimited and can be purchased in any quantity at any time.

Measured service: cloud systems may automatically control and optimize resource use by leveraging a metering capability at some level of abstraction appropriate to the type of service (e.g., storage, processing, bandwidth, and active user accounts).

A cloud model may include one or more of the following Service Models.

Software as a Service (SaaS): the capability provided to the consumer is to use the provider's applications running on a cloud infrastructure.

Platform as a Service (PaaS): the capability provided to the consumer is to deploy onto the cloud infrastructure consumer-created or acquired applications created using programming languages and tools supported by the provider.

Infrastructure as a Service (IaaS): the capability provided to the consumer is to provision processing, storage, networks, and other fundamental computing resources where the consumer is able to deploy and run arbitrary software, which can include operating systems and applications.

A cloud model may be deployed in accordance with the following Deployment Models.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Authentication system 2 may be implemented by one or more cloud computing nodes in a cloud computing environment. These nodes may be grouped, physically or virtually, in one or more networks such as Private, Community, Public, or Hybrid clouds as described above, or a combination thereof. This allows the cloud computing environment to offer infrastructure, platforms and/or software as services for which a cloud consumer does not need to maintain resources on a local computing system.

Figure 2:
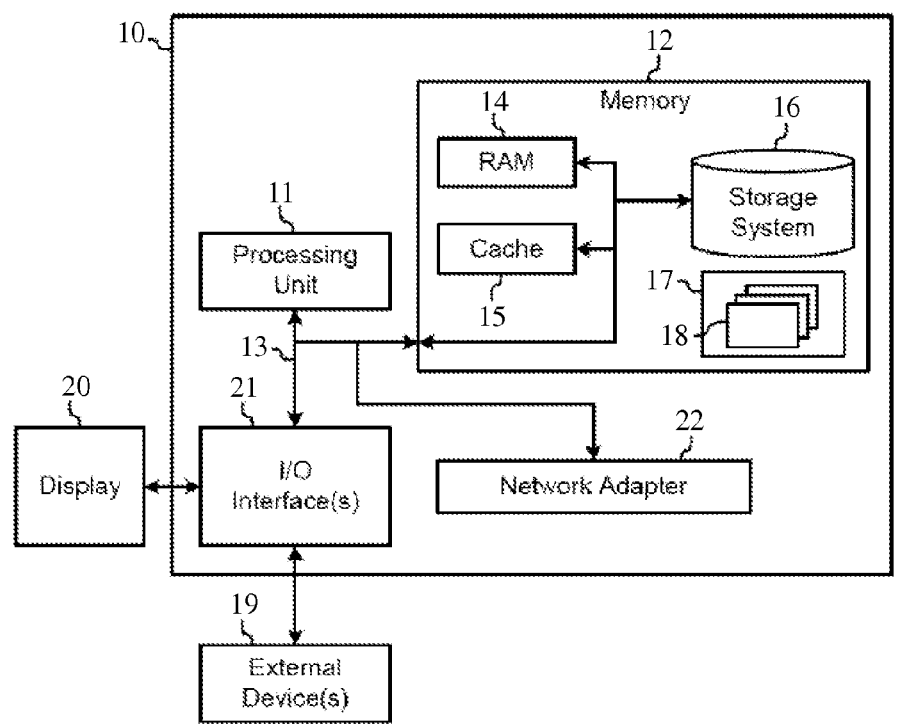
FIG. 2 is a generalized schematic of a computer in the FIG. 1 system.

The block diagram of FIG. 2 shows an exemplary computing apparatus for implementing a computer of authentication system 2, e.g. in a cloud computing node. Authentication server 5, for example, may be implemented by one or more such computers. The computing apparatus may be described in the general context of computer system-executable instructions, such as program modules, being executed by a computer system. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, program modules may be located in both local and remote computer system storage media including memory storage devices. The computing apparatus is shown in FIG. 2 in the form of a general-purpose computing device 10. The components of computer 10 may include processing apparatus such as one or more processors represented by processing unit 11, a system memory 12, and a bus 13 that couples various system components including system memory 12 to processing unit 11.

Bus 13 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 10 typically includes a variety of computer readable media. Such media may be any available media that is accessible by computer 10 including volatile and non-volatile media, and removable and non-removable media. For example, system memory 12 can include computer readable media in the form of volatile memory, such as random access memory (RAM) 14 and/or cache memory 15. Computer 10 may further include other removable/non-removable, volatile/non-volatile computer system storage media. By way of example only, storage system 16 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 13 by one or more data media interfaces.

Memory 12 may include at least one program product having one or more program modules that are configured to carry out functions of embodiments of the invention. By way of example, program/utility 17, having a set (at least one) of program modules 18, may be stored in memory 12, as well as an operating system, one or more application programs, other program modules, and program data. Each of the operating system, one or more application programs, other program modules, and program data, or some combination thereof, may include an implementation of a networking environment. Program modules 18 generally carry out the functions and/or methodologies of embodiments of the invention as described herein.

Computer 10 may also communicate with: one or more external devices 19 such as a keyboard, a pointing device, a display 20, etc.; one or more devices that enable a user to interact with computer 10; and/or any devices (e.g., network card, modem, etc.) that enable computer 10 to communicate with one or more other computing devices. Such communication can occur via Input/Output (I/O) interfaces 21. Also, computer 10 can communicate with one or more networks such as a local area network (LAN), a general wide area network (WAN), and/or a public network (e.g., the Internet) via network adapter 22. As depicted, network adapter 22 communicates with the other components of computer 10 via bus 13. It should be understood that although not shown, other hardware and/or software components could be used in conjunction with computer 10. Examples include, but are not limited to: microcode, device drivers, redundant processing units, external disk drive arrays, RAID systems, tape drives, and data archival storage systems, etc.

Figure 3:
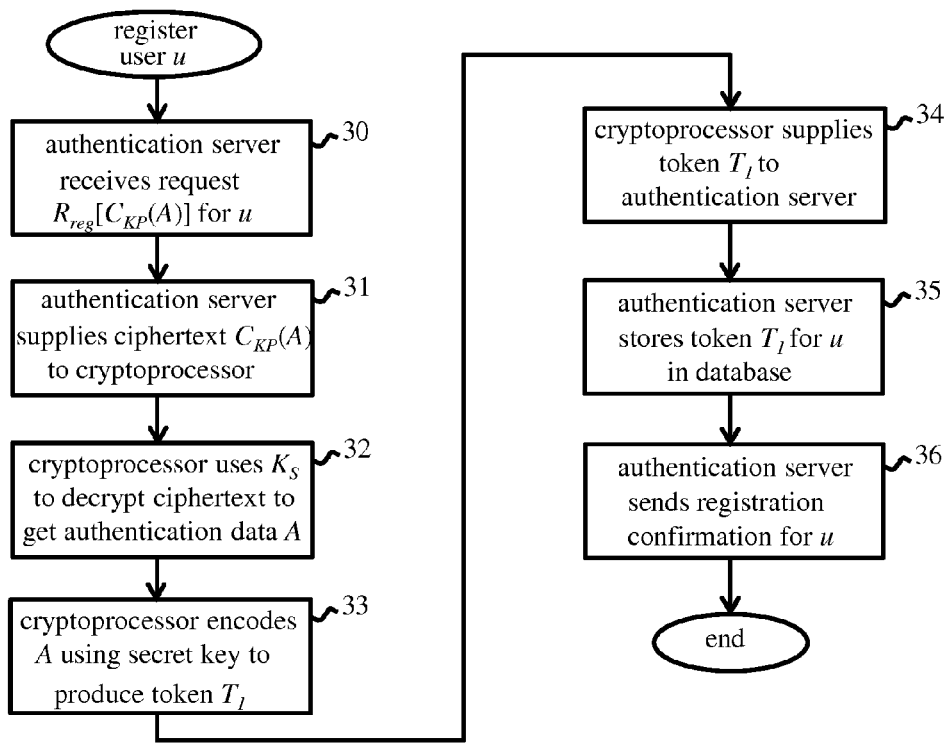
FIG. 3 indicates steps performed in a registration operation of an authentication method embodying the invention.

An overview of operation of the authentication system 2 will now be described with reference to FIGS. 3 and 4. FIG. 3 indicates steps performed in a registration operation. This registration operation is performed on request of remote computer 4 to register a user, identified by user ID u, based on user authentication data A which is typically supplied by the user to requesting computer 4. The user ID u may typically comprise a username, but may alternatively comprise a token or any other identity data for uniquely identifying the user to requesting computer 4. The authentication data A may typically comprise user password data such as a password, PIN (personal identification number), passphrase or biometric data which can be provided by a user for authentication purposes. The authentication data A may also include other data, such as the user ID u. The registration operation of FIG. 3 begins when requesting computer 4 sends a registration request $R_{reg}$ for the user ID u to authentication server 5. The registration request $R_{reg}$ comprises a ciphertext $C_{KP}(A)$ which encrypts (at least) the user authentication data A associated with user ID u under the public key $K_P$ of the public/private key pair ($K_S$, $K_P$) described above. The authentication server 5 receives the registration request $R_{reg}$ via network 3 in step 30 of FIG. 3. In step 31, the authentication server 5 supplies the ciphertext $C_{KP}(A)$ in the registration request to the secure cryptoprocessor 6. In step 32, the secure cryptoprocessor decrypts the ciphertext $C_{KP}(A)$ using its private key $K_S$ to obtain the user authentication data A for the user ID. In step 33, the secure cryptoprocessor 6 encodes the user authentication data A to produce the aforementioned cryptographic token $T_1$. The token $T_1$ is produced here via an encoding process which is dependent on a secret key of the cryptoprocessor 6. This secret key may be the private key $K_S$ or another secret key K as illustrated by examples below. In step 34, the cryptoprocessor 6 supplies the token $T_1$ to authentication server 5. In step 35, the authentication server 5 stores the token $T_1$ for the user ID u in database 7. In step 36, the authentication server sends a registration confirmation message for the user ID u to requesting computer 4 via network 3. The registration operation for the user is then complete.

Figure 4:
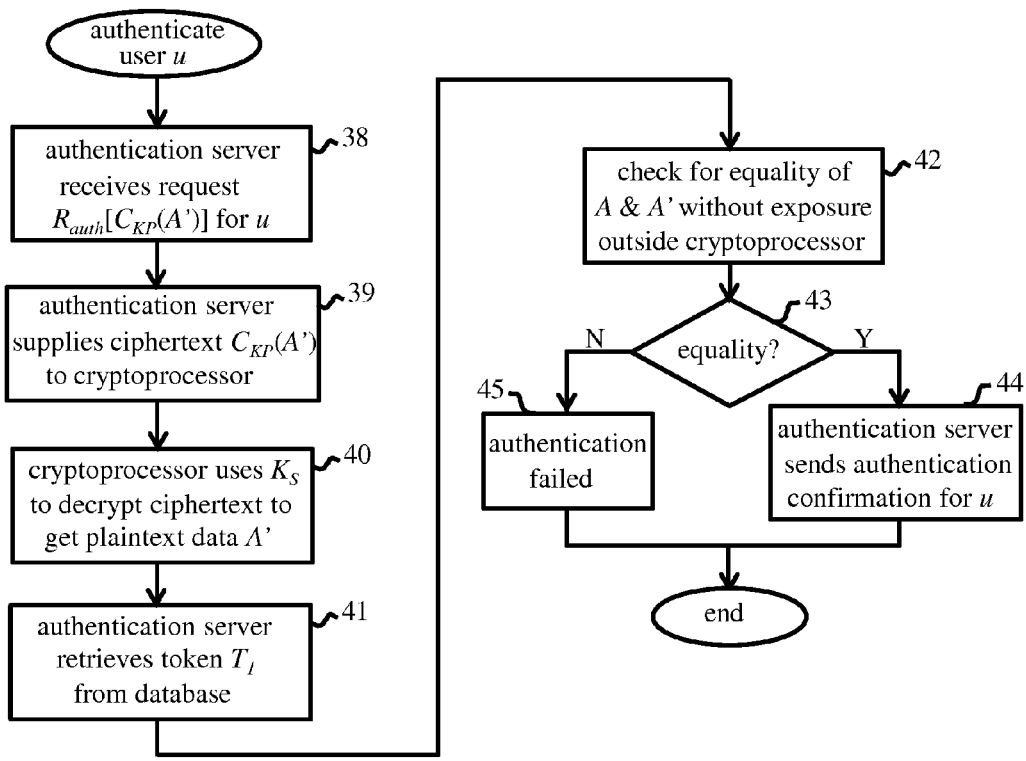
FIG. 4 indicates steps performed in operation of the authentication method.

FIG. 4 indicates steps performed in subsequent user authentication operation. This operation is performed in response to an authentication request $R_{auth}$ for the user ID u which is sent by requesting computer 4 to the authentication server 5. The authentication request $R_{auth}$ comprises a ciphertext $C_{KP}(A')$ which encrypts (at least) user authentication data A', supplied by the user identified by user ID u, under the public key $K_P$ of the key pair ($K_S$, $K_P$). The authentication server 5 receives the authentication request $R_{auth}$ via network 3 in step 38 of FIG. 4. In step 39, the authentication server 5 supplies the ciphertext $C_{KP}(A')$ in the authentication request to the secure cryptoprocessor 6. In step 40, the secure cryptoprocessor decrypts the ciphertext $C_{KP}(A')$ using its private key $K_S$ to obtain the plaintext user authentication data A'. In step 41, the authentication server 5 retrieves from database 7 the token $T_1$ which was previously stored for the user ID u in the registration operation. In step 42, the authentication system 2 checks for equality of the plaintext user authentication data A' and the user authentication data A encoded in the token $T_1$. As illustrated by examples below, this equality check may be performed by the secure cryptoprocessor alone or may comprise steps performed by both the secure cryptoprocessor and the authentication server. The equality check is performed via a cryptographic processing operation in which the authentication data is not exposed outside the secure cryptoprocessor 6. That is, neither the user authentication data A encoded in token $T_1$, nor the plaintext user authentication data A', is exposed outside secure cryptoprocessor 6 in this operation. In response to determination of equality of A and A', as indicated by a "Yes" (Y) at decision block 43, the authentication server sends an authentication confirmation message for the user ID u to remote computer 4 via the network. In response to failure of the equality check (i.e. decision "No" (N) at block 43), the authentication process fails at step 45. The authentication server may then send an authentication failure message for u to remote computer 4 if desired.

The above system provides an easy and convenient process for user authentication over networks, offering security even in open systems such as the Internet. The user authentication data is sent to the authentication server in encrypted form based on the PKI, and can only be decrypted by the secure cryptoprocessor. The token T1 stored in database 7 is produced by the secure cryptoprocessor and encodes the user authentication data in dependence on a secret key thereof. This inhibits so-called "offline attacks" whereby an adversary acquires a copy of the authentication database and attempts to brute-force the authentication data by trying all possibilities. The security guarantees of the underlying PKI and secure cryptoprocessor are thus propagated to the authentication system. In particular, the security features, properties and guarantees of the secure cryptoprocessor are propagated to stored tokens in the authentication system, while the PKI guarantees that users' authentication data is transmitted to the cryptoprocessor in a secure way.

The particular order in which steps of the registration and authentication operations are performed may vary from that shown in FIGS. 3 and 4, depending on implementation. Some examples are illustrated in the following.

Figure 5:
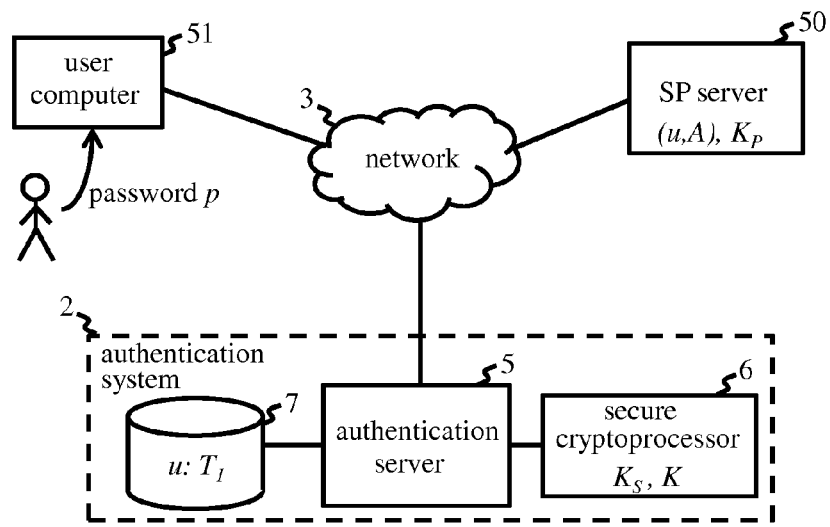
FIG. 5 indicates configuration of a system employing a second authentication method embodying the invention.

An exemplary embodiment of the above system will be described in more detail with reference to FIGS. 5 through 7. FIG. 5 indicates a scenario in which the requesting computer is provided by an SP server 50. The SP server 50 performs access control for a restricted resource of a service provider. A user, operating a user computer 51, can connect to SP server 50 via network 3. In this way, authorized users can request access to the resource by presenting their authentication data to the SP server. The authentication process is outsourced to authentication system 2 which provides an AaaS facility to the service provider. In this embodiment, a user, who is identified to SP server 50 by a username u, inputs a password p at user computer 51 when requesting access to the resource. The authentication system 2 is generally as described above. In this embodiment, however, the secure cryptoprocessor 6 stores an additional secret key K as discussed further below.

Figure 6:
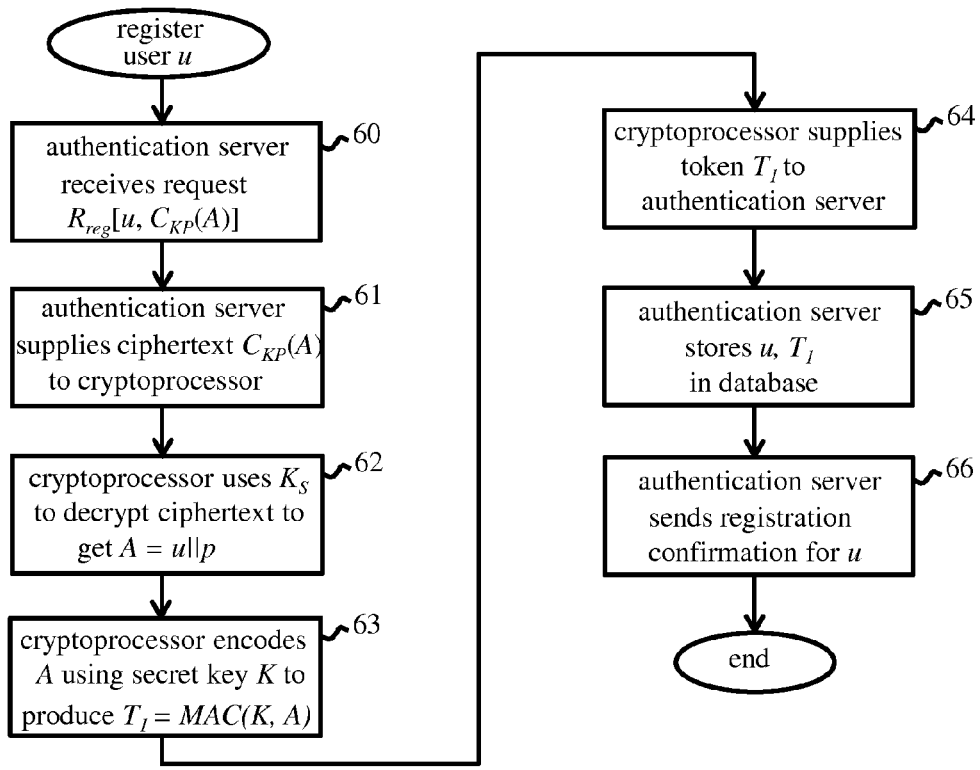
FIG. 6 indicates steps performed in a registration operation of the second embodiment.

FIG. 6 indicates steps of a registration operation for this embodiment. The registration operation begins when SP server 50 sends a registration request $R_{reg}$ for the user ID u to authentication server 5. The registration request $R_{reg}$ comprises the username u and a ciphertext $C_{KP}(A)$ which encrypts user authentication data A under the public key $K_P$ of the public/private key pair ($K_S$, $K_r$). (Any convenient encryption scheme can be employed in the PKI here, examples including RSA (Rivest-Shamir-Adleman) and ElGamal encryption). In this example, the authentication data A=u||p is a concatenation (or other combination) of the username u and user password p as established for the user with SP server 50. The authentication server 5 receives the registration request $R_{reg}$ in step 60 of FIG. 6. In step 61, the authentication server 5 supplies the ciphertext $C_{KP}(A)$ to the secure cryptoprocessor 6 and requests a "Decrypt and Sign" operation. In step 62, the secure cryptoprocessor decrypts the ciphertext $C_{KP}(A)$ using its private key $K_S$ to obtain the user authentication data A=u||p. In step 63, the secure cryptoprocessor 6 encodes the user authentication data A, via a deterministic function using the secret key K, to produce a first cryptographic token $T_1$. In this example, the deterministic function comprises a Message Authentication Code (MAC). The secret key K is generated by the secure cryptoprocessor 6 for use in token generation, and is secret to the cryptoprocessor. This key K may comprise an arbitrary bit string such as a string of cryptographically-random bits of sufficient length as to inhibit determination by guesswork. The result of the Decrypt and Sign operation is the token $T_1$=MAC(K, A) which is output to authentication server 5 in step 64. In step 65, the authentication server 5 stores the token $T_1$ for the user ID u in database 7. The database 7 returns "OK" to the authentication server on successful storage of the token. In step 66, the authentication server then sends a registration confirmation message for the user u to SP server 50, and the registration operation for the user is complete. The SP server 50 may then send a confirmation message to user computer 51 to indicate successful registration of the user u.

Figure 7:
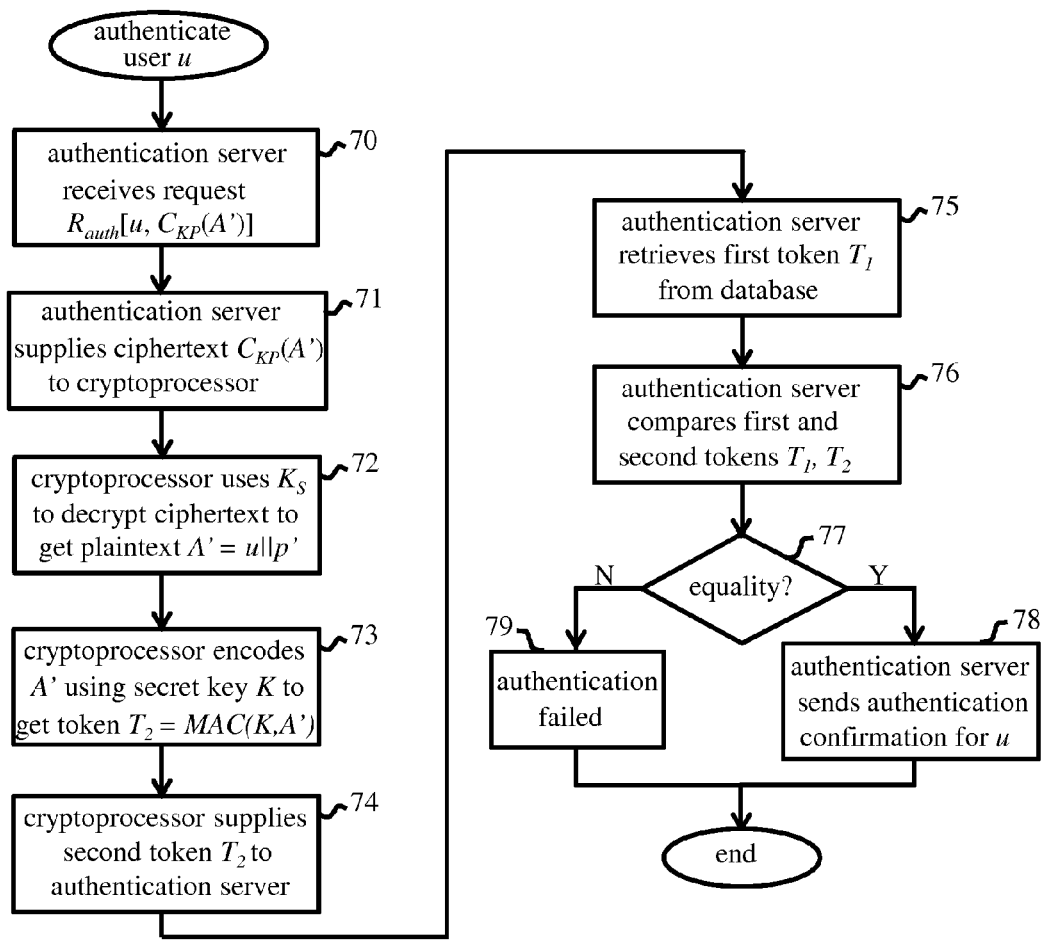
FIG. 7 indicates steps performed in the second authentication method.

FIG. 7 indicates steps performed in a subsequent user authentication operation. This operation begins when SP server 50 sends authentication request $R_{auth}$ for the user ID u to the authentication server 5. The authentication request $R_{auth}$ comprises the username u and a ciphertext $C_{KP}(A')$ which encrypts user authentication data A' under the public key $K_P$, where the authentication data A'=u||p' and p' is a password attempt supplied by the user to SP server 50. The authentication request $R_{auth}$ is received by authentication server 5 in step 70 of FIG. 7. In step 71, the authentication server 5 supplies the ciphertext $C_{KP}(A')$ to secure cryptoprocessor 6 and requests a Decrypt and Sign operation. In step 72, the secure cryptoprocessor decrypts the ciphertext $C_{KP}(A')$ using its private key $K_S$ to obtain the plaintext user authentication data A'. In step 73, the cryptoprocessor 6 encodes the user authentication data A' using the secret key K as MAC(K, A') to produce a second cryptographic token $T_2$. The second token $T_2$=MAC(K, A') is output to authentication server 5 in step 74. In step 75, the authentication server 5 retrieves from database 7 the first token $T_1$ stored for user u in the registration operation. In step 76, the authentication server 5 compares the tokens $T_1$ and $T_2$ to check for equality of the plaintext user authentication data A' and the user authentication data A encoded in the first token $T_1$. If the tokens are the same then A=A'. If equality is determined ("Y" at decision block 77, the authentication server sends an authentication confirmation message for u to SP server 50. The SP server can then permit user access to the controlled resource. If the equality check fails, i.e. "N" at block 77, the authentication process fails at step 79. The authentication server may then send an authentication failure message to SP server 50 and the user is denied access to the resource.

In this embodiment, the tokens $T_1$ and $T_2$ are produced by encoding inside secure cryptoprocessor 6, whereby the authentication data A and A' is not exposed outside the cryptoprocessor. The MAC function used for token generation does not leak any information about any of its attributes. For enhanced security, the decryption and MAC encoding is performed as a single atomic operation in the cryptoprocessor 6 in response to the Decrypt and Sign request. Security guarantees of the cryptoprocessor 6 are propagated to the authentication server 5 and authentication database 7, as the authentication server sees only an asymmetrically encrypted string (u‖p) or (u‖p') and a MAC of each of these strings. All of these are cryptographically secure by definition. Only the username u and the MAC token $T_1$ are stored in the authentication database. Thus, if an adversary attacks the authentication system, even if he monitors all data which flows through the system, he does not learn anything about the user passwords. If he attacks the authentication database, since tokens $T_1$ are derived using the secret key K generated by cryptoprocessor 6, an offline attack is infeasible. In addition, dictionary-based statistical attacks are frustrated in this embodiment because the user ID u is combined with the user password in the MAC-encoded authentication data. Hence, even if two users share the same password, the derived token will be different since the usernames used by SP server 50 are unique. Moreover, the system does not require any specialist software at user computers 51 and users can perform conventional password-based authentication.

Other deterministic functions may of course be used for token generation in the above embodiment. Examples include keyed PRFs (Pseudo-Random Functions), keyed one-way-functions, and keyed cryptographic hashes. Where the authentication system provides the AaaS facility to multiple service providers and user IDs u are not necessarily unique, tokens for different SPs may be stored in different data structures in data storage 7, or may be stored with a service provider ID in addition to the user ID. The user authentication data may also include the service provider ID in this case, and/or different secret keys K may be used for different service providers. The token retrieval step 75 may be performed at an earlier stage of the FIG. 7 process if desired. Embodiments may also be envisaged where the user ID u is encrypted in ciphertexts $C_{KP}(A)$ and $C_{KP}(A')$, and can be identified as such by cryptoprocessor 6, but is not separately indicated in registration and authentication requests. The cryptoprocessor 6 may then extract the user ID and supply this to the authentication server in steps 64 and 74 above.

Figure 8:
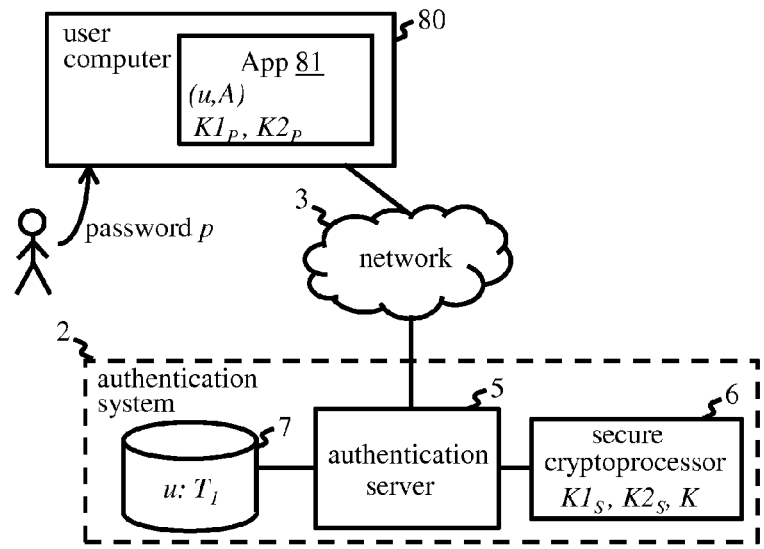
FIG. 8 indicates configuration of a system employing a third authentication method embodying the invention.

Another exemplary embodiment will now be described with reference to FIGS. 8 through 10. FIG. 8 indicates a scenario in which requesting computer is provided by a user computer 80 running an application (App) 81. App 81 requires user authentication for operation, and the user can presenting his authentication data to the App by input to user computer 80. The communications channel between the user and App 81 is thus in a trusted environment provided by user computer 80. For simplicity in this example, the user authentication data is based on a username u and user password p as before. In general, however, a token or any other authentication data associated with a user ID may be employed here. The authentication system 2 provides an AaaS facility to the App provider, and is generally as described above. In this embodiment, however, as well as the secret key K, the secure cryptoprocessor 6 stores the private keys $K1_S$ and $K2_S$ of first and second public/private key-pairs $(K1_S, K1_P)$ and $(K2_S, K2_P)$. Both private keys $K1_S$ and $K2_S$ are generated by secure cryptoprocessor 6 in accordance with the PKI system and remain secret to the secure cryptoprocessor. The public keys $K1_P$ and $K2_P$ are published and thus known to App 81.

Figure 9:
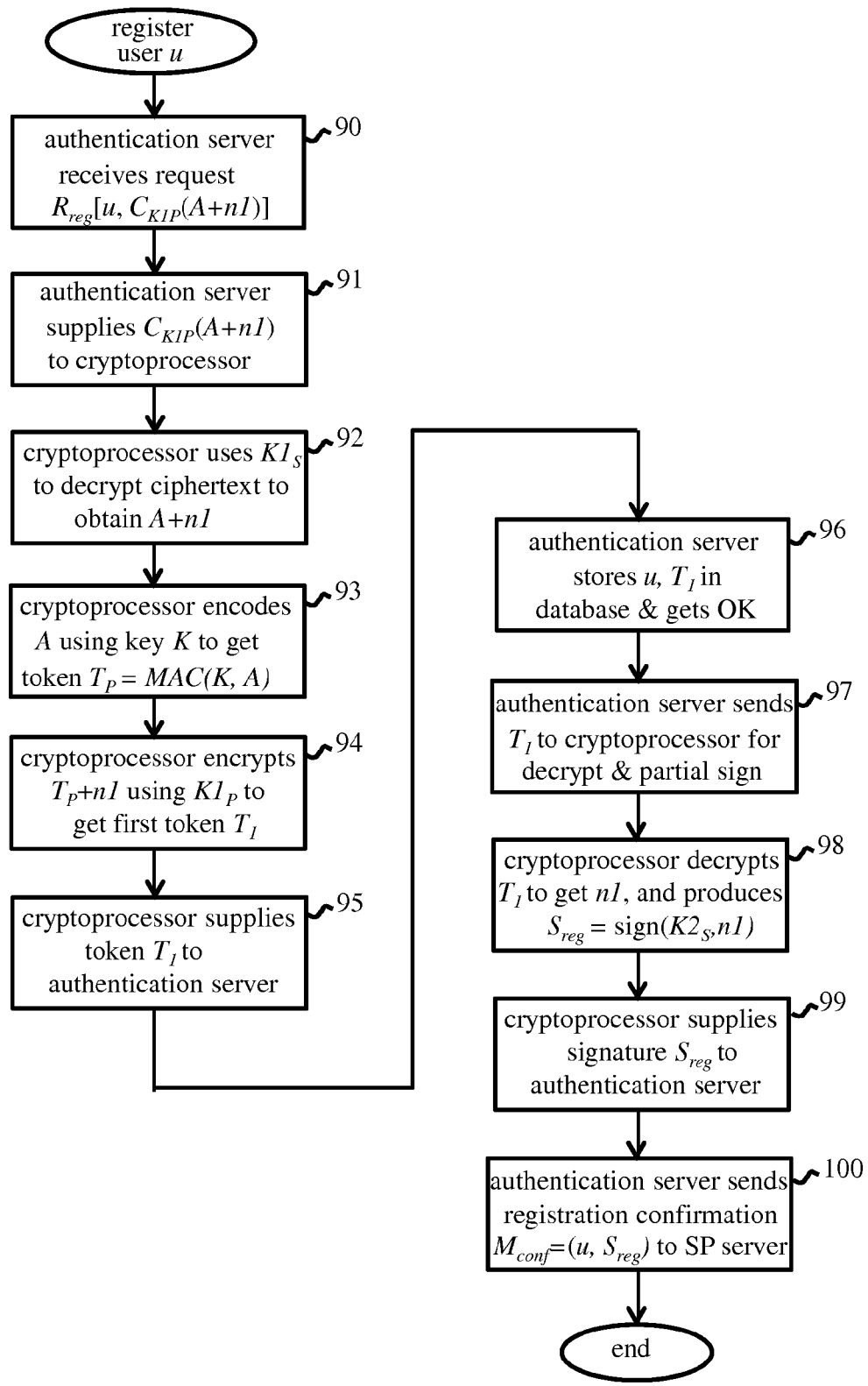
FIG. 9 indicates steps performed in a registration operation of the third embodiment.

FIG. 9 indicates steps of a registration operation for this embodiment. The registration operation begins when App 81 sends a registration request $R_{reg}$ for the user ID u to authentication server 5. The registration request $R_{reg}$ comprises the username u and a ciphertext $C_{K1P}(A+n1)$ which encrypts the user authentication data A (here A=u‖p), and a registration nonce n1, under the public key $K1_P$ of the first key pair. Registration nonce n1 is a fixed-length, one-time nonce generated by App 81, and may comprise a random bit-string with high-entropy, e.g. a 128-bit random UUID (Universal Unique Identifier). The nonce n1 is cached by App 81 for later comparison. The authentication server 5 receives the registration request $R_{reg}$=[u, $C_{K1P}(A+n1)$] in step 90 of FIG. 9. In step 91, the authentication server 5 supplies the ciphertext $C_{K1P}(A+n1)$ to the secure cryptoprocessor 6 and requests a "Decrypt and Create Token" operation. In step 92, the secure cryptoprocessor decrypts the ciphertext $C_{K1P}(A+n1)$ using private key $K1_S$ to obtain the user authentication data A=u‖p and the registration nonce n1. In step 93, the cryptoprocessor 6 then encodes the user authentication data A and registration nonce n1 via a deterministic function using the secret key K to produce a preliminary token $T_P$. A MAC is used in this example, although other deterministic functions may be employed as desired. In step 94, the secure cryptoprocessor 6 encrypts the preliminary token $T_P$=MAC(K, A) and the registration nonce n1 under the public key K1P to produce a first token $T_1$. The result of the Decrypt and Create Token operation is thus a token $T_1$=$C_{K1P}$[MAC(K, A)+n1] which is output to authentication server 5 in step 95. In step 96, the authentication server 5 stores the token $T_1$ for the user ID u in database 7. The database 7 returns "OK" to the authentication server on successful storage of the token. In step 97, the authentication server returns the token $T_1$ to cryptoprocessor 6 and requests a "Decrypt and Partial Sign" operation. In step 98, the cryptoprocessor decrypts the token $T_1$ using private key $K1_S$ to obtain the registration nonce n1. The cryptoprocessor produces a registration signature $S_{reg}$ by cryptographically signing the registration nonce n1 with its private key $K2_S$ of the second public-private key pair. (Any convenient cryptographic signature scheme can be employed in the PKI here, examples including RSA (Rivest-Shamir-Adleman) and DSA (Digital Signature Algorithm) signatures). The resulting registration signature $S_{reg}$=Sign($K2_S$, n1) is supplied to authentication server 5 in step 99. In step 100, the authentication server sends a registration confirmation message comprising the registration signature $S_{reg}$ for the user ID, here $M_{conf}$=(u, $S_{reg}$), to the App 81. The App 81 can decrypt the registration signature $S_{reg}$ in the message $M_{conf}$ using the public key $K2_S$ of the second key pair. In this way, the App 81 retrieves the registration nonce n1 for comparison with the nonce cached earlier by the App. If the nonce is correct, the App knows that the registration processes has been successfully completed for the user.

Figure 10:
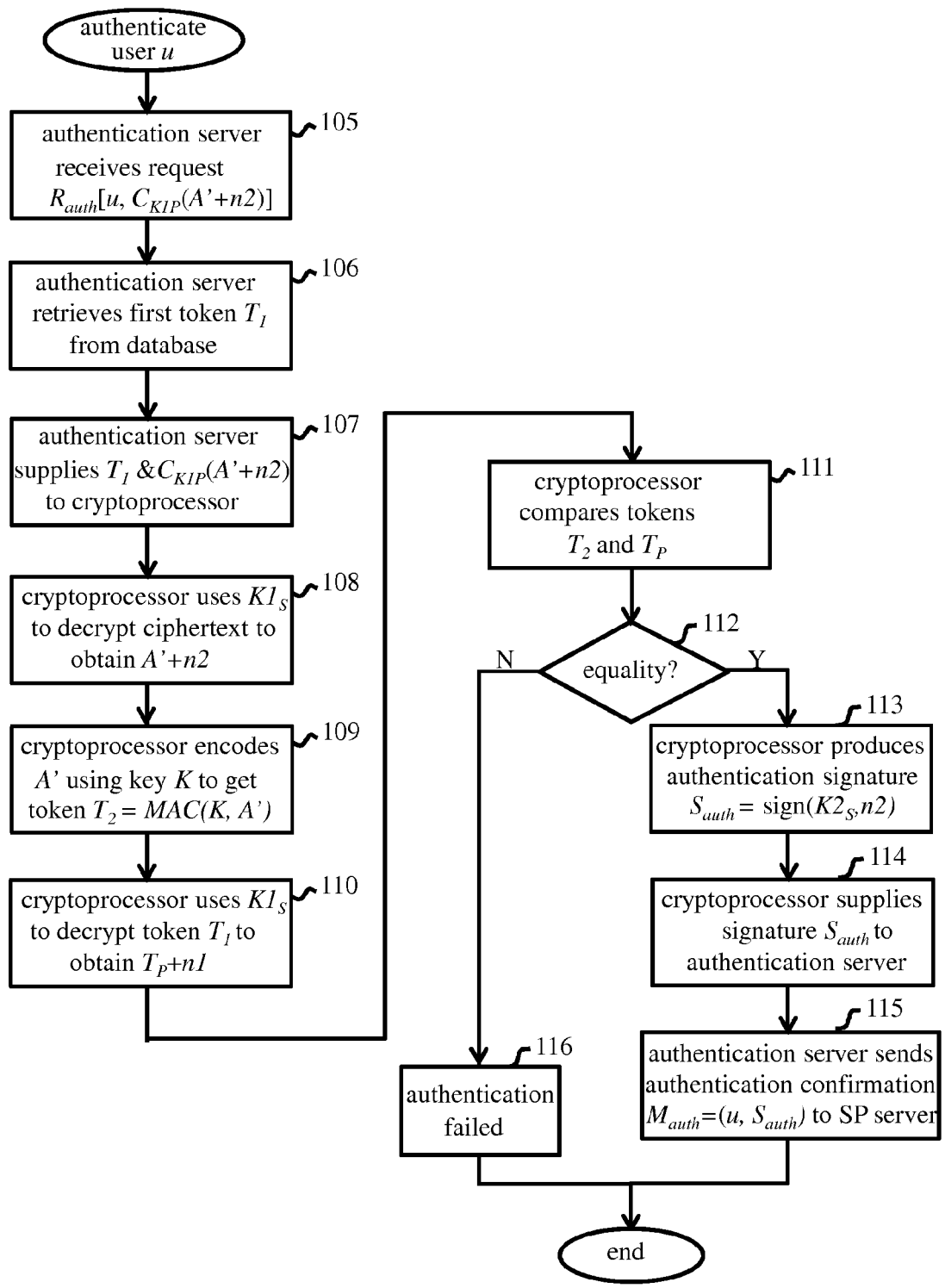
FIG. 10 indicates steps performed in the third authentication method.

FIG. 10 indicates steps performed in a subsequent user authentication operation. This operation begins when App 81 sends an authentication request $R_{auth}$ for the user ID u to authentication server 5. The authentication request $R_{auth}$ comprises the username u and a ciphertext $C_{K1P}(A'+n2)$ which encrypts user authentication data A', and an authentication nonce n2, under the public key $K1_P$ of the first key pair. The authentication data A'=u‖p' here, where p' is a password attempt input by the user. Authentication nonce n2 is a fixed-length, one-time nonce generated by App 81 as before, and is cached by App 81 for later comparison. The authentication server 5 receives the authentication request $R_{auth}$=[u, $C_{K1P}(A'+n2)$] in step 105 of FIG. 10. In step 106, the authentication server 5 retrieves from database 7 the first token $T_1$ stored for user u in the registration operation. In step 107, the authentication server 5 supplies the ciphertext $C_{K1P}(A'+n2)$ with token $T_1$ to secure cryptoprocessor 6 and requests a Decrypt, Partial Compare and Partial Sign operation. In step 108, the cryptoprocessor decrypts the ciphertext $C_{K1_P}(A'+n2)$ using its private key $K1_S$ to obtain the plaintext user authentication data A' and the authentication nonce n2. In step 109, the cryptoprocessor 6 encodes the plaintext authentication data A' using the secret key K as MAC(K, A') to produce a second token $T_2$. In step 110, the secure cryptoprocessor 6 decrypts the first token $T_1$ using its private key $K1_S$ to obtain the preliminary token $T_P$ and the registration nonce n1. In step 111, the cryptoprocessor 6 checks for equality of the plaintext user authentication data A' and the user authentication data A encoded in the first token $T_1$ by comparing the second token $T_2$=MAC(K, A') and the preliminary token $T_P$=MAC(K, A). If equality is determined ("Y" at decision block 112), then in step 113 the cryptoprocessor produces an authentication signature $S_{auth}$=Sign($K2_S$, n2) by cryptographically signing the authentication nonce n2 with the private key $K2_S$ of the second public-private key pair. The authentication signature $S_{auth}$ is supplied to authentication server 5 in step 114. In step 115, the authentication server sends an authentication confirmation message comprising the authentication signature $S_{auth}$ for the user ID u, here $M_{auth}$=(u, $S_{auth}$), to the App 81. The App 81 can decrypt the signature $S_{auth}$ in the message $M_{auth}$ using ing the public key $K2_P$ of the second key a u pair. In this way, the App 81 retrieves the authentication nonce n2 for comparison with the nonce cached earlier by the App. If the nonce is correct, the App knows that the authentication process has been successfully completed for the user. If the equality check fails, i.e. "N" at block 112, the authentication process fails at step 116. The authentication server may then send an authentication failure message to App 81 and the user is denied access by the App.

With the above system, offline attacks are again frustrated because the token $T_1$ stored in database 7 leaks no information about the authentication data. The nonces are one-time, random values and are thus not usable by an attacker. Message sniffing attacks are also frustrated. If an adversary listens into communications between authentication server 5 and database 7 he sees only tokens $T_1$. If an adversary listens into communications between the App and the authentication server, he sees only encrypted data. The ciphertext does not leak any information about the encrypted data. Moreover, the registration and authentication signatures in the above scheme provide a mechanism for an authenticated response from the authentication system 2 to the App 81. The responses always contain a one-time random nonce signed by the secure cryptoprocessor. The nonce never leaves the cryptoprocessor in the plain, only signed. If an adversary successfully creates a "man-in-the-middle" between the App and authentication server, he cannot create a "transaction successful" scenario if the authentication data is incorrect due to use of the authentication signature. An adversary obtaining privileged access to the authentication system sees only ciphertexts and tokens. Neither of these leak any information about the user authentication data.

In a modification to the above embodiment, the secure cryptoprocessor could encrypt the second token $T_2$ and authentication nonce n2 under the public key $K1_P$ in step 109, thus producing a third token which is output to the authentication server. The authentication server could then return this third token with the first token $T_1$ on retrieval from database 7. In the Decrypt, Partial Compare and Partial Sign operation, the cryptoprocessor then decrypts both tokens and compares the MACs. This modification allows the same operation and function call to be used for token generation in the registration and authentication operations. In this case, the authentication server may update the first token stored in database 7 with the fresh, third token on successful authentication.

Figure 11:
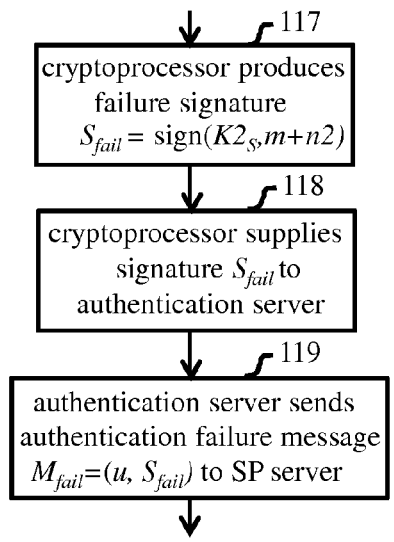
FIG. 11 indicates a modification to the FIG. 10 method.

A preferred variation of the above embodiment is indicated by steps 117 to 119 of FIG. 11 which correspond to step 116 of FIG. 10. In response to failure of the equality check in step 112 above, the cryptoprocessor produces a failure signature comprising the authentication nonce n2 cryptographically signed with a private key, secret to the secure cryptoprocessor, of a public-private key pair. This may be the private key $K2_S$ of the second key pair above as indicated in step 117. This failure signature can be supplied to the authentication server in step 118 and included in the authentication failure message to App 81. As indicated in step 119 here, the failure signature may sign both nonce n2 and a predetermined failure message m. In general, one or both of the authentication and failure signatures may include other data, such as a predetermined message, to distinguish the two types of signature. By using a failure signature, an attacker cannot "fool" the App that there is an authentication failure if authentication was successful. If there is a failure signature in the response message, the App knows that the authentication data was indeed checked by the secure cryptoprocessor.

In other scenarios, App 81 may not reside on user computer 80 but may be accessed from a user computer via any communications channel. This channel may remain in a trusted environment, for example via a network connection providing secure communications such as TLS (Transport Layer Security) or SSL (Secure Sockets Layer).

Figure 12:
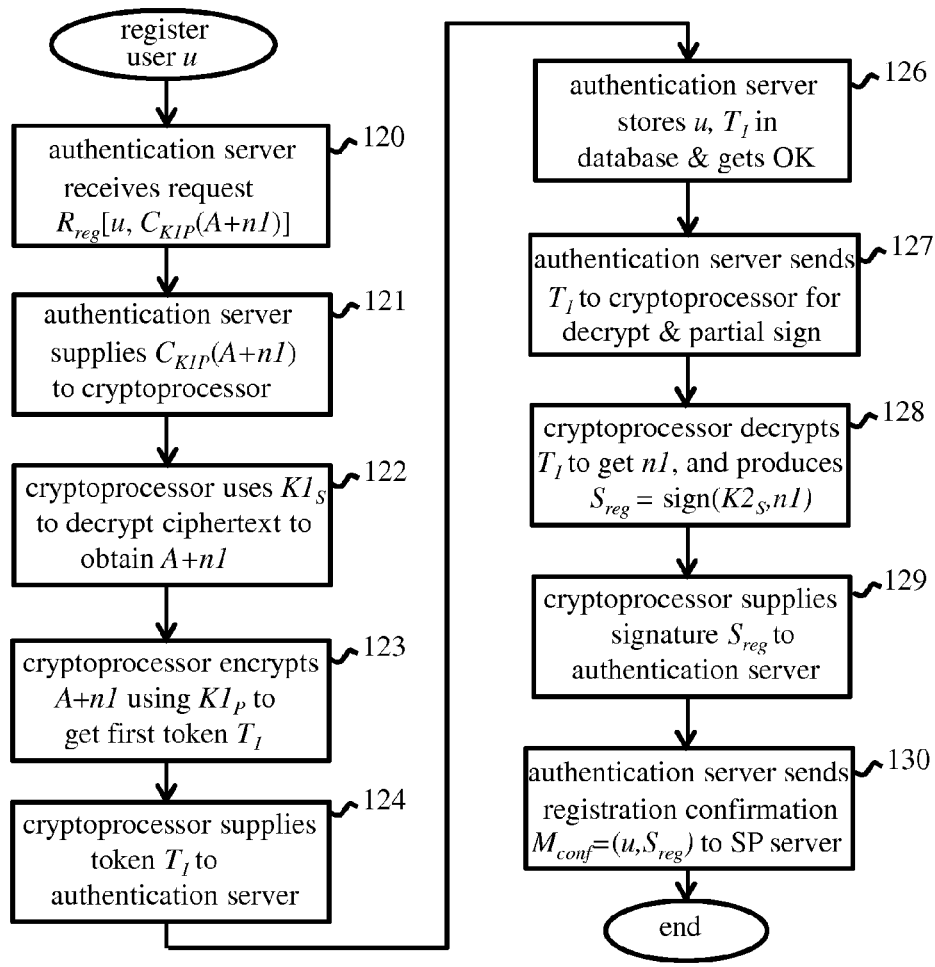
FIGS. 12 and 13 indicate steps of registration and authentication operations respectively in a third authentication method embodying the invention.
Figure 13:
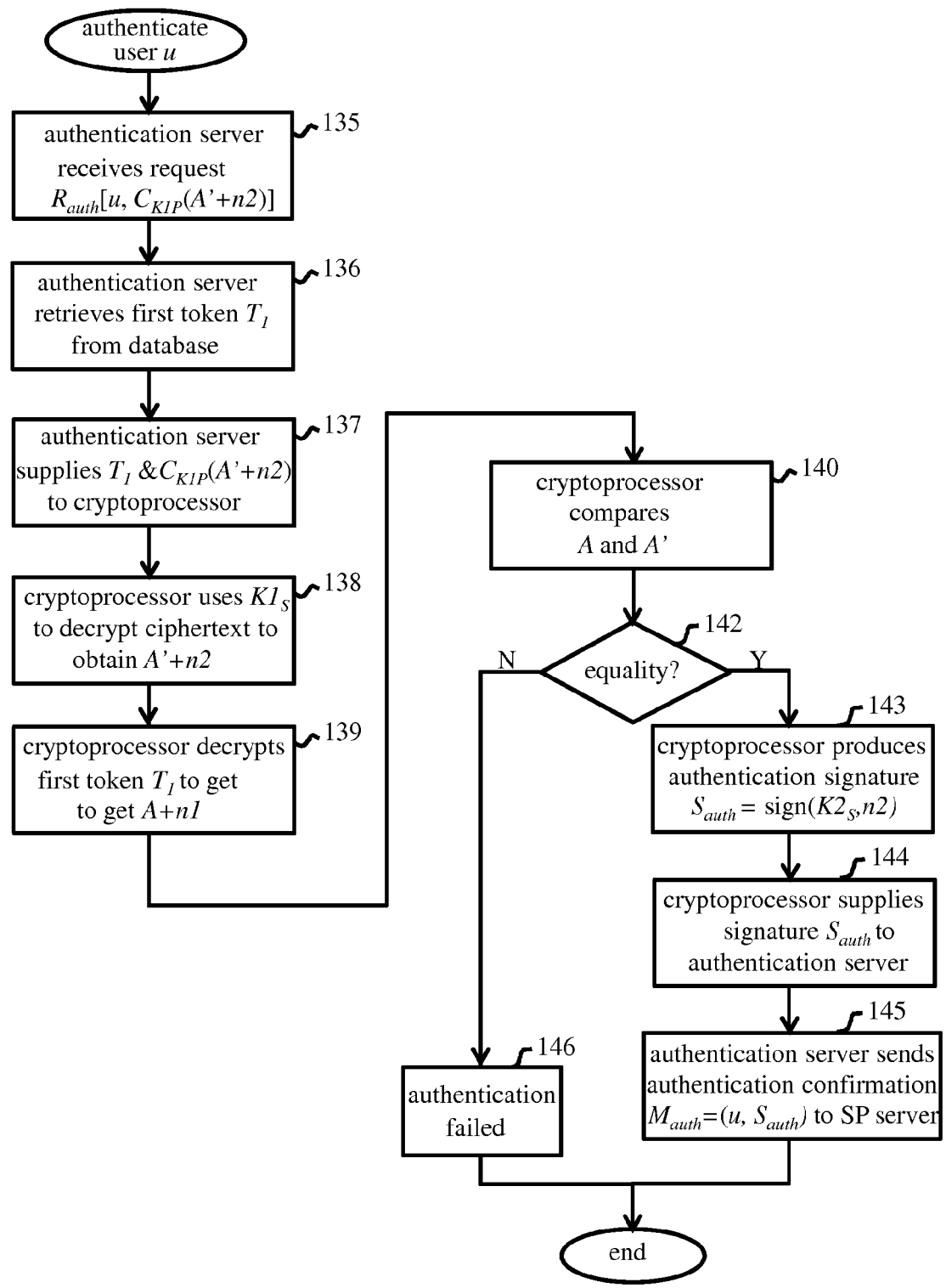

In another variation, use of the deterministic function may be omitted from the foregoing embodiment. Examples of registration and authentication operations for such an embodiment are indicated in FIGS. 12 and 13. In the registration operation of FIG. 12, steps 120 to 122 correspond to steps 90 to 93 of FIG. 9. In step 123, however, the secure cryptoprocessor 6 encrypts the authentication data A and the registration nonce n1 under the public key $K1_P$ to produce a first token $T_1$. The result of the Decrypt and Create Token operation is thus a token $T_1$=$C_{K1_P}$(A+n1). As previously, this token is produced via an encoding process (here encryption) which is dependent on a secret key (here the private key $K1_S$) since the public key $K1_P$ used for encryption is itself dependent on the private key $K1_S$. The token $T_1$ is output to authentication server 5 in step 124, and the remaining steps 126 to 130 of the procedure correspond to steps 96 to 100 of FIG. 9. In the authentication operation of FIG. 13, steps 135 to 138 correspond to steps 105 to 108 of FIG. 10. In step 139, however, the cryptoprocessor decrypts the first token $T_1$ using its private key $K1_S$ to obtain the user authentication data A and registration nonce n1. In step 140, the cryptoprocessor 6 checks for equality of the plaintext authentication data A' from step 138 and the user authentication data A from the first token $T_1$ by comparing A and A'. The remaining steps 142 to 146 of the procedure correspond to steps 112 to 116 of FIG. 10.

Many other modifications can of course be made to the above embodiments. In general, features and modifications described for one embodiment can be applied in other embodiments as appropriate. For example, use of nonces and signatures for confirmation of registration, authentication and authentication failure can be applied in the embodiment of FIGS. 6 and 7 if desired.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for authenticating user authentication data, associated with a user ID, at an authentication system comprising an authentication server connected to a network and a secure cryptoprocessor operatively coupled to the authentication server, the method comprising:
   providing, in a data storage device operatively coupled to the authentication server, a first token for said user ID, the first token being produced by the secure cryptoprocessor by encoding the user authentication data associated with the user ID via a deterministic function using a secret key of the secure cryptoprocessor to produce a preliminary token, and encrypting the preliminary token under a public key of a first public-private key pair to produce the first token;
   at the authentication server, receiving an authentication request for the user ID from a remote computer via the network, the authentication request comprising a ciphertext encrypting user authentication data under the public key of the first public-private key pair the private key of which is secret to the secure cryptoprocessor, and supplying the ciphertext to the secure cryptoprocessor;
   at the secure cryptoprocessor, decrypting the ciphertext using said private key to obtain plaintext user authentication data;
   at the authentication server, retrieving said first token for the user ID from said data storage device;
   in the authentication system, checking for equality of said plaintext user authentication data and the user authentication data encoded in the first token via a cryptographic processing operation in which the authentication data is not exposed outside the secure cryptoprocessor; and
   at the authentication server, in response to said equality, sending an authentication confirmation message to the remote computer via the network, wherein the method includes:
   at the authentication server, supplying the first token to the secure cryptoprocessor;
   at the secure cryptoprocessor, decrypting the first token using said private key to obtain the preliminary token, encoding said plaintext user authentication data via said deterministic function using said secret key to produce a second token, and comparing the second token and the preliminary token to check for said equality; and the method further comprising:
   including, in a registration operation for said user ID:
   receiving, at the authentication server, a registration request for the user ID from the remote computer via the network, the registration request comprising a ciphertext encrypting the user authentication data associated with the user ID, and a registration nonce, under said public key, and supplying the ciphertext to the secure cryptoprocessor;
   decrypting, at the secure cryptoprocessor, the ciphertext using said private key to obtain the user authentication data associated with the user ID and the registration nonce, encoding the user authentication data associated with the user ID via said deterministic function using said secret key to produce said preliminary token, encrypting the preliminary token and the registration nonce under said public key to produce the first token, and supplying the first token to the authentication server; and
   storing, at the authentication server, the first token for the user ID in said data storage device.

2. The method as claimed in claim 1 further comprising, in a registration operation for said user ID:
   at the authentication server, receiving a registration request for the user ID from the remote computer via the network, the registration request comprising a ciphertext encrypting the user authentication data associated with the user ID under said public key, and supplying the ciphertext to the secure cryptoprocessor;
   at the secure cryptoprocessor, decrypting the ciphertext using said private key to obtain the user authentication data associated with the user ID, encoding the user authentication data via said encoding process dependent on said secret key to produce said first token, and supplying the first token to the authentication server; and
   at the authentication server, storing the first token for the user ID in said data storage device.

3. The method as claimed in claim 1 wherein said ciphertext in the user authentication request encrypts said user authentication data and an authentication nonce, and wherein the method includes:
   at the secure cryptoprocessor, in response to said equality, producing an authentication signature comprising the authentication nonce cryptographically signed with a private key, secret to the secure cryptoprocessor, of a second public-private key pair, and supplying the signature to the authentication server;
   wherein said authentication confirmation message comprises the authentication signature.

4. The method as claimed in claim 1 further comprising:
   at the secure cryptoprocessor, in response to failure of the equality check, producing a failure signature comprising the authentication nonce cryptographically signed with a private key, secret to the secure cryptoprocessor, of a second public-private key pair, and supplying the failure signature to the authentication server; and
   at the authentication server, sending an authentication failure message, comprising the failure signature, to the remote computer via the network.

5. The method as claimed in claim 1 wherein said first token is produced by encoding the user authentication data associated with the user ID via a deterministic function using said secret key, and wherein the method includes:
   at the secure cryptoprocessor, encoding said plaintext user authentication data via said deterministic function using said secret key to produce a second token, and supplying the second token to the authentication server; and
   at the authentication server, comparing the first and second tokens to check for said equality.

6. The method as claimed in claim 1 further comprising, in a registration operation for said user ID:
   at the authentication server, receiving a registration request for the user ID from the remote computer via the network, the registration request comprising a ciphertext encrypting the user authentication data associated with the user ID, and a registration nonce, under said public key, and supplying the ciphertext to the secure cryptoprocessor;

at the secure cryptoprocessor, decrypting the ciphertext using said private key to obtain the user authentication data associated with the user ID and the registration nonce, encrypting the user authentication data and the registration nonce under said public key to produce said first token, and supplying the first token to the authentication server; and at the authentication server, storing the first token for the user ID in said data storage device.

7. The method as claimed in claim 6 further comprising, in said registration operation:
   at the secure cryptoprocessor, producing a registration signature comprising the registration nonce cryptographically signed with a private key, secret to the secure cryptoprocessor, of a second public-private key pair, and supplying the registration signature to the authentication server; and
   at the authentication server, sending a registration confirmation message, comprising the registration signature, to the remote computer via the network.

8. The method as claimed in claim 6 further comprising:
   at the authentication server, in response to said authentication request, supplying the first token to the secure cryptoprocessor; and
   at the secure cryptoprocessor, decrypting the first token using said private key to obtain the user authentication data associated with the user ID and comparing that user authentication data with said plaintext user authentication data to check for said equality.

9. The method as claimed in claim 1 including, in said registration operation:
   at the secure cryptoprocessor, producing a registration signature comprising the registration nonce cryptographically signed with a private key, secret to the secure cryptoprocessor, of a second public-private key pair, and supplying the registration signature to the authentication server; and
   at the authentication server, sending a registration confirmation message, comprising the registration signature, to the remote computer via the network.

10. The method as claimed in claim 1 wherein said user authentication data associated with the user ID comprises the user ID and user password data.

11. A system for authenticating user authentication data associated with a user ID, the system comprising:
    an authentication server connectable to a network;
    a secure cryptoprocessor operatively coupled to the authentication server, and
    a data storage device, operatively coupled to the authentication server, for storing for said user ID a first token produced by the secure cryptoprocessor by encoding the user authentication data associated with the user ID via an encoding process dependent on a secret key of the secure cryptoprocessor, wherein:
    the authentication server is adapted, in response to receipt of an authentication request for the user ID from a remote computer via the network, the authentication request comprising a ciphertext encrypting user authentication data under a public key of a first public-private key pair the private key of which is secret to the secure cryptoprocessor, to supply the ciphertext to the secure cryptoprocessor and to retrieve said first token for the user ID from the data storage device;
    the secure cryptoprocessor is adapted to decrypt the ciphertext using said private key to obtain plaintext user authentication data;
    the system is adapted to check for equality of said plaintext user authentication data and the user authentication data encoded in the first token via a cryptographic processing operation in which the authentication data is not exposed outside the secure cryptoprocessor; and
    the authentication server is adapted, in response to said equality, to send an authentication confirmation message to the remote computer via the network and the authentication server is further adapted, in a registration operation for said user ID,
    wherein the authentication server receives a registration request for the user ID from the remote computer via the network, the registration request comprising a ciphertext encrypting the user authentication data associated with the user ID, and a registration nonce, under said public key, to supply the ciphertext to the secure cryptoprocessor;
    the secure cryptoprocessor is adapted, in response to receipt of the ciphertext in said registration operation, to decrypt the ciphertext using said private key to obtain the user authentication data associated with the user ID and the registration nonce, to encrypt the user authentication data and the registration nonce under said public key to produce said first token, and to supply the first token to the authentication server;
    the authentication server is further adapted, in response to receipt of the first token in said registration operation, to store the first token for the user ID in said data storage device;
    the authentication server is further adapted, in response to said authentication request, to supply the first token to the secure cryptoprocessor; and
    the secure cryptoprocessor is further adapted, in response to receipt of the first token, to decrypt the first token using said private key to obtain the user authentication data associated with the user ID and to compare that user authentication data with said plaintext user authentication data to check for said equality.

12. The system as claimed in claim 11 wherein said first token comprises an encoding of the user authentication data associated with the user ID via a deterministic function using said secret key, and wherein:
    the secure cryptoprocessor is adapted to encode said plaintext user authentication data via said deterministic function using said secret key to produce a second cryptographic token, and to supply the second token to the authentication server; and
    the authentication server is adapted to compare the first and second tokens to check for said equality.

13. The system as claimed in claim 11 wherein said first token comprises an encryption under said public key of a preliminary token produced by encoding the user authentication data associated with the user ID via a deterministic function using said secret key, and wherein:
    the authentication server is adapted, in response to said authentication request, to supply the first token to the secure cryptoprocessor;
    the secure cryptoprocessor is adapted, in response to receipt of the first token, to decrypt the first token using said private key to obtain the preliminary token, to encode said plaintext user authentication data via said deterministic function using said secret key to produce a second token, and to compare the second token and the preliminary token to check for said equality.

14. A computer program product for authenticating user authentication data, associated with a user ID, in an authentication system comprising:
- an authentication server connectable to a network,
- a secure cryptoprocessor operatively coupled to the authentication server, and
- a data storage device, operatively coupled to the authentication server, for storing for said user ID a first token produced by the secure cryptoprocessor by encoding the user authentication data associated with the user ID via an encoding process dependent on a secret key of the secure cryptoprocessor, said computer program product comprising a non-transitory computer readable storage medium having embodied therein:
- first program instructions executable by the authentication server after receipt by the server of an authentication request for the user ID from a remote computer via the network, the authentication request comprising a ciphertext encrypting user authentication data under a public key of a first public-private key pair the private key of which is secret to the secure cryptoprocessor, to cause the server to supply the ciphertext to the secure cryptoprocessor and to retrieve said first token for the user ID from the data storage device;
- second program instructions executable by the secure cryptoprocessor to cause the cryptoprocessor to decrypt the ciphertext using said private key to obtain plaintext user authentication data;
- third program instructions executable by at least one of the server and cryptoprocessor of said system to cause the system to check for equality of said plaintext user authentication data and the user authentication data encoded in the first token via a cryptographic processing operation in which the authentication data is not exposed outside the secure cryptoprocessor; and
- fourth program instructions executable by the authentication server, in response to said equality, to cause the server to send an authentication confirmation message to said remote computer via the network, and
- further program instructions executable by the authentication server in a registration operation for said user ID wherein the server receives a registration request for the user ID from the remote computer via the network, the registration request comprising a ciphertext encrypting the user authentication data associated with the user ID, and a registration nonce, under said public key, to cause the server to supply the ciphertext to the secure cryptoprocessor;
- further program instructions executable by the secure cryptoprocessor to cause the cryptoprocessor, in response to receipt of the ciphertext in said registration operation, to decrypt the ciphertext using said private key to obtain the user authentication data associated with the user ID and the registration nonce, to encrypt the user authentication data and the registration nonce under said public key to produce said first token, and to supply the first token to the authentication server; and
- further program instructions executable by the authentication server, to cause the server, in response to receipt of the first token in said registration operation, to store the first token for the user ID in said data storage device;
- wherein said third program instructions comprise additional program instructions executable by the authentication server, to cause the server, in response to said authentication request, to supply the first token to the secure cryptoprocessor, and further program instructions executable by the secure cryptoprocessor to cause the cryptoprocessor, in response to receipt of the first token, to decrypt the first token using said private key to obtain the user authentication data associated with the user ID and to compare that user authentication data with said plaintext user authentication data to check for said equality.

15. The computer program product as claimed in claim 14 wherein said first token comprises an encoding of the user authentication data associated with the user ID via a deterministic function using said secret key, and wherein said third program instructions comprise:
- fifth program instructions executable by the secure cryptoprocessor to cause the cryptoprocessor to encode said plaintext user authentication data via said deterministic function using said secret key to produce a second cryptographic token, and to supply the second token to the authentication server; and
- sixth program instructions executable by the authentication server to cause the server to compare the first and second tokens to check for said equality.

16. The computer program product as claimed in claim 14 wherein said first token comprises an encryption under said public key of a preliminary token produced by encoding the user authentication data associated with the user ID via a deterministic function using said secret key, and wherein said third program instructions comprise:
- twelfth program instructions executable by the authentication server, to cause the server, in response to said authentication request, to supply the first token to the secure cryptoprocessor; and
- thirteenth program instructions executable by the secure cryptoprocessor to cause the cryptoprocessor, in response to receipt of the first token, to decrypt the first token using said private key to obtain the preliminary token, to encode said plaintext user authentication data via said deterministic function using said secret key to produce a second token, and to compare the second token and the preliminary token to check for said equality.

* * * * *